July 6, 1965  D. A. EBERWINE  3,193,213
SPACE VEHICLE DOCKING COUPLERS
Filed Aug. 5, 1963  2 Sheets-Sheet 1
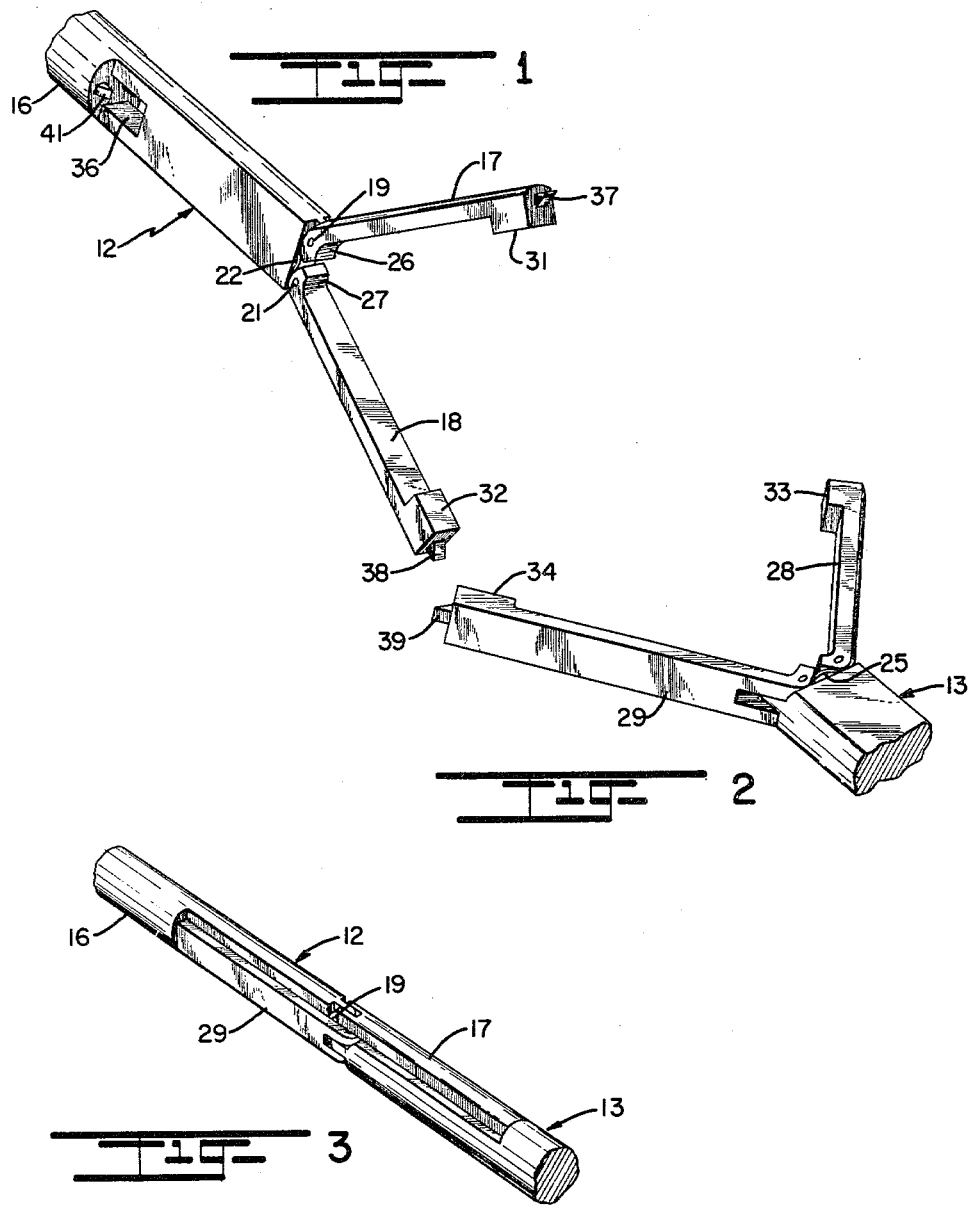
INVENTOR.
DONALD A. EBERWINE
BY
*Sheridan and Ross*
ATTORNEYS

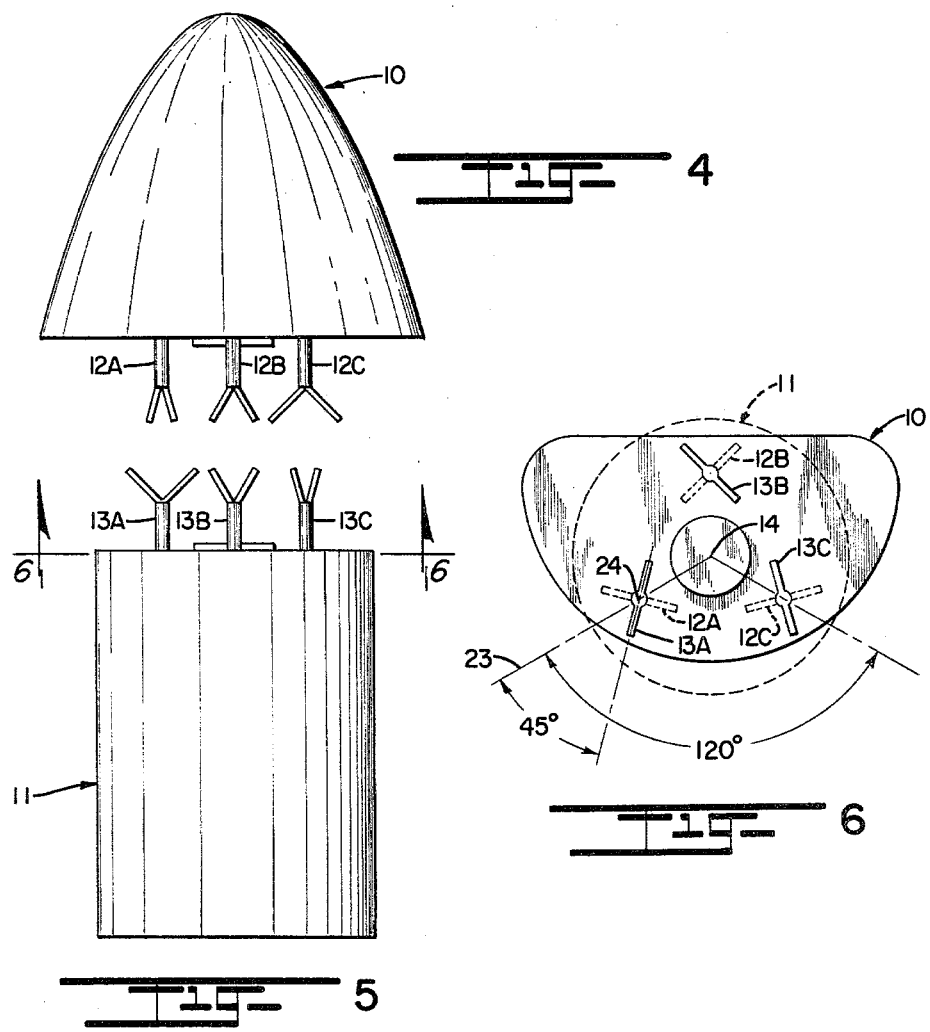

United States Patent Office 3,193,213
Patented July 6, 1965

3,193,213
SPACE VEHICLE DOCKING COUPLERS
Donald A. Eberwine, Aurora, Colo., assignor to Martin-Marietta Corporation, Baltimore, Md., a corporation of Maryland
Filed Aug. 5, 1963, Ser. No. 299,754
4 Claims. (Cl. 244—1)

This invention relates to inter-vehicle attaching means, and particularly to couplers for interconnecting space vehicles which have been brought into close proximity with respect to each other while in flight.

It is essential that space vehicles in flight should be capable of being rendezvoused and docked so that crew members, equipment and supplies can be transferred from one vehicle to the other. The docking or coupling mechanism for the vehicles should be designed for remote operation and control so that crew men are not required to venture from the relative safety of their pressurized cabins into space to operate the mechanism. For similar reasons the coupling mechanism should operate largely automatically. A fully automatic coupling mechanism also permits the coupling of two completely unmanned vehicles in space.

Accordingly, it is an important object of this invention to provide a rendezvous, docking and coupling mechanism for space vehicles which operates automatically to a sufficient degree to overcome initial misalignment between vehicles to be coupled and interconnects the vehicles by remote control.

Another object of this invention is to provide space vehicle docking coupler means which is capable of interconnecting and disconnecting two vehicles while in flight in space when one of the vehicles is unmanned or otherwise inert.

Additional objects will become apparent from the following description of the invention, which is given primarily for purposes of illustration and not limitation.

Stated in general terms, the objects of this invention are attained by providing a coupler arrangement which consists of a plurality of coupler units oriented cooperatively on each space vehicle to be docked and interconnected. Each coupler unit includes an arm member and a pair of finger members pivotally mounted on the end of the arm member. In an open position the finger members form an acute angle with respect to each other. At the apex of the acute angle each finger member is provided with a cam portion which, when pressed, causes the finger members to pivot toward each other to a closed position.

The coupler units are cooperatively oriented on each space vehicle so that each coupler unit of one vehicle pairs off with a coupler unit of the other vehicle being docked. The coupler units guide, align and actuate each other during docking by the mutual application of pressure upon the cam portions of the finger members so that the finger members are closed upon each other in a clasping interconnecting relationship. Each arm member is retractable so that the docking vehicles can be drawn tightly together and interconnected.

A more detailed description of a specific embodiment of the invention is given below with reference to the accompanying drawings, wherein:

FIG. 1 is a partial isometric view showing a coupler unit including a portion of an arm member and a pair of finger members in the open position;

FIG. 2 is a similar view showing another coupler unit oriented for engagement with the coupler unit of FIG. 1;

FIG. 3 is a similar view showing the coupler units of FIGS. 1 and 2 in closed positions upon each other in mutually clasping and interconnecting relationship;

FIG. 4 is a schematic plan view showing a space vehicle provided with a coupler arrangement consisting of three oriented coupler units;

FIG. 5 is a similar view showing another space vehicle in docking relationship with the vehicle of FIG. 4; and FIG. 6 is an elevational view taken as along line 6—6 of FIG. 5 and showing the vehicle of FIG. 5 in phantom.

Each space vehicle 10 and 11 to be docked is provided at the docking end thereof with three spaced and oriented coupler units, such as units 12 and 13 shown in FIGS. 1 and 2, respectively. Thus vehicle 10 is provided with three coupler units 12a, 12b and 12c oriented in equally spaced relationship with respect to each other, and in an equal angle radial pattern about a point 14 on the docking end of the vehicle. Vehicle 11 is similarly provided with three coupler units 13a, 13b and 13c. Each coupler unit is at a predetermined distance from a point 14 at the center of the radial pattern.

Each coupler unit, such as unit 12 shown in FIG. 1, includes an arm member 16 and two finger members 17 and 18. The pair of finger members 17 and 18 are pivotally mounted at 19 and 21 on the end of arm member 16. Finger members 17 and 18 normally are urged and held in an open position, as best shown in FIGS. 1 and 2, by spring pressure from a leaf spring 22 (FIG. 1) or 25 (FIG. 2). Thus, prior to coupling, finger members 17 and 18 are held at an acute angle of about 80° to each other in an open position.

As best shown in FIG. 6, each pair of finger members 17 and 18 attached to each arm member 16 is fixed at an angle of 45° from a radial line 23 drawn from the center 24 of an arm member 13a to the center 14 of the radial pattern. This 45° angle is measured in the same direction in all of the coupler units 12 and 13 on all of the space vehicles such as 10 and 11. Each coupler unit 12 and 13 is arranged to couple with an identical coupler unit with finger members 17 and 18 facing it, when the finger members are in an open position and thereby at an angle of 90° to those of the other coupler unit.

Each coupler unit 12 and 13 is provided with suitable means (not shown) to retract the coupler unit into its vehicle 10 or 11. In this manner the two docking space vehicles 10 and 11 are tightly drawn together after docking and form an air-tight seal between the gasketed mating surfaces of the docking ends of the vehicles. This arrangement also permits withdrawal of the coupler units 12 and 13 inside the space vehicles 10 and 11, respectively, for protection from heat during re-entry of the space vehicles into the atmosphere.

Each coupler unit 12 and 13 is provided with camming surfaces 26 and 27, as best shown in FIG. 1, at the pivotally attached ends of finger members 17 and 18, respectively. Camming surfaces 26 and 27 are designed so that, during docking, pressure applied by similar camming surfaces of the other of a paired off coupling unit 12 and 13, causes the finger members 17 and 18 of each paired off coupling unit to move, against the pressure of spring 22, from the normally open position of FIGS. 1 and 2 to the closed position of FIG. 3. The acute angular configuration of the pivoted finger members 17 and 18 of each paired coupler unit 12 and 13, as is best seen from FIGS. 1 and 2, guide and align each other and the space vehicles 10 and 11 to which they are attached, during the docking operation, and thus compensate for any initial misalignment. Thus each coupler unit 12 and 13 of the pair, mutually actuate each other through mutual pressure applied to mutually cooperating pairs of camming surfaces 26 and 27, from an open position to a closed position in which each coupler unit is closed upon the other of the pair in a clasping, interconnecting relationship, as best shown in FIG. 3.

The finger members 17 and 18 of each coupler unit 12, 28 and 29 of each coupler unit 13, of a pair of units, as best shown in FIGS. 1 and 2, are provided with projecting tip portions 31 and 32, 33 and 34, respectively. Also, the arm members, such as arm member 16 of coupler unit 12, are provided with suitably located and suitably shaped recesses 36 for the reception and nesting therein of tip portions, such as tip portion 34 in recess 36. In addition, each finger member, such as best shown on finger members 17, 18 and 29 is provided with a latch member 37, 38 and 39, respectively. The shaped recesses, such as recess 36 are provided with suitable latch members 41, suitably located and shaped to mate with the corresponding latch member, such as latch member 39 on finger member 29 of coupler unit 13.

Thus coupling of a pair of opposed coupler units 12 and 13 is automatically accomplished by forcing the camming surfaces 26 and 27 of coupler unit 12 against the corresponding camming surfaces of coupler unit 13. This causes finger members 17 and 18, 28 and 29, respectively, to pivot inwardly from their normally open positions, causing corresponding projecting finger tip portions 31 and 32, 33 and 34, respectively, to nest in corresponding recesses such as recess 36, and causing each latch member such as latch member 39, on each finger member to engage the corresponding latch member, such as latch member 41, in each corresponding recess, such as recess 36 in the arm member of the opposed coupler unit. With the cooperating latch members thus engaged, as shown in FIG. 3, each pair of coupler units 12 and 13 is positively coupled and interconnected.

It is noteworthy that each coupler unit is identical on all vehicles so that each vehicle equipped with the subject couplers is capable of coupling with all other vehicles similarly equipped.

Uncoupling is accomplished by simultaneous withdrawal, preferably be remote means, such as by means of cables or solenoids (not shown), of all of the latch members in all of the coupler units 12 and 13 of either docked space vehicle 10 and 11, while applying a separating thrust to either vehicle, or to both vehicles simultaneously. Thus an uncoupling operation can be achieved from either one of the two coupled space vehicles even though the other space vehicle is inert.

It will be understood that although the use of three coupler units on each space vehicle has been described and illustrated hereinabove, the use of one or two, or more than three is contemplated as being within the scope of this invention. Also, the angle between the finger members of the coupler unit can be varied and various latch member structures and means can be used.

Obviously, many other modifications and variations of the present invention are possible in the light of the teachings given hereinabove. It is, therefore, to be understood that, within the scope of the appended claims, the invention can be practiced otherwise than as specifically described.

What is claimed is:

1. A space vehicle coupler arrangement which comprises a coupler unit including an arm member, a pair of finger members pivotally mounted on the arm member, spring means cooperatively associated with the finger members for holding the same in a open position, and cam means on the finger members for urging the same into a closed position by application of pressure upon the cam means.

2. A space vehicle coupler arrangement which comprises a pair of opposed coupler units each mounted on one of a pair of space vehicles at the docking end thereof, each coupler unit including an arm member connected to the space vehicle, a pair of finger members pivotally mounted on the arm member, spring means cooperatively associated with the finger members for holding the same in open position, and cam means on the finger members for urging the same into a closed position by mutual application of pressure of the cam means of one coupler unit upon those of the other opposed coupler unit.

3. A space vehicle coupler arrangement which comprises a pair of opposed coupler units each mounted on one of a pair of space vehicles at the docking end thereof, each coupler unit including an arm member connected to the space vehicle, a pair of finger members pivotally mounted on the arm member, spring means cooperatively associated with the finger members for holding the same in an open position, cam means on the finger members for urging the same into a closed position by mutual application of pressure of the cam means of one coupler unit upon those of the opposed coupler unit, engagement means formed on the finger members of the opposed coupler units for mutually engaging and interconnecting the coupler units, and recess means formed on the arm members of the opposed coupler units for mutually receiving and nesting therein the engagement means during interconnection of the coupler units.

4. A space vehicle coupler arrangement which comprises a pair of opposed coupler units each mounted on one of a pair of space vehicles at the docking end thereof, each coupler unit including an arm member connected to the space vehicle, a pair of finger members pivotally mounted on the arm member to form an acute angle of about 80° with each other, spring means cooperatively associated with the finger members for holding the same in an open position, cam means formed on the finger members for urging the same into closed positions by mutual application of pressure of the cam means of one coupler unit upon those of the opposed coupler unit, engagement means formed on the finger members of the opposed coupler units for mutually engaging and interconnecting the coupler units, latch means mounted on the engagement means for interlocking the interconnecting coupler units, recess means formed on the arm members of the opposed coupler units for mutually receiving and nesting therein the engagement means during interconnection of the coupler units, and latch means mounted in the recess means for interlocking with the latch means on the engagement means to interlock the interconnecting coupler units.

References Cited by the Examiner

UNITED STATES PATENTS 274,749  3/83  Filson _____ 213—88
513,019  1/94  Kelley _____ 213—90

OTHER REFERENCES

Astronautics, September 1962, pages 23 and 24.

FERGUS S. MIDDLETON, *Primary Examiner.*